(12) United States Patent
Tan (10) Patent No.: US 10,983,619 B2
(45) Date of Patent: Apr. 20, 2021

(54) TOUCH DISPLAY PANEL, FINGERPRINT RECOGNITION DEVICE, AND DISPLAY DEVICE

(71) Applicant: BOE TECHNOLOGY GROUP CO., LTD., Beijing (CN)

(72) Inventor: Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 199 days.

(21) Appl. No.: 16/329,811

(22) PCT Filed: Jul. 20, 2018

(86) PCT No.: PCT/CN2018/096438
§ 371 (c)(1),
(2) Date: Mar. 1, 2019

(87) PCT Pub. No.: WO2019/015668
PCT Pub. Date: Jan. 24, 2019

(65) Prior Publication Data
US 2019/0220124 A1 Jul. 18, 2019

(30) Foreign Application Priority Data

Jul. 21, 2017 (CN) .......................... 201710598626.0

(51) Int. Cl.
*G06F 3/041* (2006.01)
*G02F 1/1333* (2006.01)
(Continued)

(52) U.S. Cl.
CPC .......... *G06F 3/0412* (2013.01); *G02B 6/122* (2013.01); *G02B 27/30* (2013.01); *G02F 1/1343* (2013.01);
(Continued)

(58) Field of Classification Search
CPC ................. G06F 3/0412; G06F 3/0421; G06F 3/041661; G06F 2203/04109;
(Continued)

(56) References Cited

U.S. PATENT DOCUMENTS

2004/0095524 A1 5/2004 Date et al.
2009/0051848 A1* 2/2009 Minoura ................ G02F 1/1335
349/62
(Continued)

FOREIGN PATENT DOCUMENTS

CN 101825797 A 9/2010
CN 104020896 A 9/2014
(Continued)

OTHER PUBLICATIONS

Chinese Office Action in Chinese Application No. 201710598626.0, dated Aug. 21, 2019 with English translation.
(Continued)

*Primary Examiner* — Kent W Chang
*Assistant Examiner* — Andrew Lee
(74) *Attorney, Agent, or Firm* — Collard & Roe, P.C.

(57) ABSTRACT

A touch display panel, a fingerprint recognition device and a display device are provided. The touch display panel includes: a waveguide plate (001) and a first substrate (003), a liquid crystal layer (004) and an electrode structure (005) between the waveguide plate (001) and the first substrate (003); a reflective layer (006) at a first side of the first substrate (003) facing toward the liquid crystal layer (004), and photosensitive units (007) at the first side, or at a second side of the waveguide plate (001) facing toward the liquid crystal layer (004), the electrode structure (005) controls a refractive index of the liquid crystal layer (004), to allow light to be emitted out from a first surface (001A) of the waveguide plate (001) closer to the liquid crystal layer
(Continued)

(004), or allow light to be totally reflected inside the waveguide plate (001), thereby achieving an optical-type touch recognition.

18 Claims, 5 Drawing Sheets

(51) Int. Cl.
    *G02B 6/122* (2006.01)
    *G02B 27/30* (2006.01)
    *G02F 1/1343* (2006.01)
    *G06F 3/042* (2006.01)
    *G02F 1/1335* (2006.01)
(52) U.S. Cl.
    CPC .... *G02F 1/13338* (2013.01); *G02F 1/133504* (2013.01); *G02F 1/133553* (2013.01); *G06F 3/0421* (2013.01); *G06F 3/041661* (2019.05); *G06F 2203/04103* (2013.01); *G06F 2203/04109* (2013.01)
(58) Field of Classification Search
    CPC ..... G06F 2203/04103; G02F 1/133504; G02F 1/133553; G02F 1/13338; G02F 1/1343; G02B 6/122; G02B 27/30
    See application file for complete search history.

(56) References Cited

U.S. PATENT DOCUMENTS

| | | | | |
|---|---|---|---|---|
| 2011/0297975 | A1* | 12/2011 | Yeh | H04N 9/315 257/88 |
| 2013/0127713 | A1* | 5/2013 | Yang | G06F 3/0421 345/158 |
| 2017/0185234 | A1* | 6/2017 | Zhang | G06F 3/0421 |
| 2018/0188591 | A1* | 7/2018 | Park | G02F 1/133504 |
| 2019/0102593 | A1 | 4/2019 | Wang et al. | |
| 2019/0121171 | A1 | 4/2019 | Tan | |
| 2019/0220124 | A1 | 7/2019 | Tan | |

FOREIGN PATENT DOCUMENTS

| | | |
|---|---|---|
| CN | 106228144 A | 12/2016 |
| CN | 106291943 A | 1/2017 |
| CN | 205983428 U | 2/2017 |
| CN | 106526944 A | 3/2017 |
| CN | 106647093 A | 5/2017 |
| CN | 106773229 A | 5/2017 |
| CN | 106934384 A | 7/2017 |
| CN | 107238961 A | 10/2017 |
| EP | 0 977 077 A2 | 2/2000 |
| JP | 2008-197519 A | 8/2008 |

OTHER PUBLICATIONS

International Search Report of PCT/CN2018/096438 in Chinese, dated Oct. 18, 2018, with English translation.
Notice of Transmittal of the International Search Report of PCT/CN2018/096438 in Chinese, dated Oct. 18, 2018.
Written Opinion of the International Searching Authority of PCT/CN2018/096438 in Chinese, dated Oct. 18, 2018 with English translation.
Chinese Office Action in Chinese Application No. 201710598626.0, dated Sep. 17, 2020 with English translation.

* cited by examiner

TOUCH DISPLAY PANEL, FINGERPRINT RECOGNITION DEVICE, AND DISPLAY DEVICE

CROSS REFERENCE TO RELATED APPLICATIONS

This application is the National Stage of PCT/CN2018/096438 filed on Jul. 20, 2018, which claims priority under 35 U.S.C. § 119 of Chinese Application No. 201710598626.0 filed on Jul. 21, 2017, the disclosure of which is incorporated by reference.

TECHNICAL FIELD

Embodiments of the present disclosure relate to a touch display panel, a fingerprint recognition device and a display device.

BACKGROUND

With rapid development of display technologies, touch display panels are gradually and widely spread throughout people's lives. At present, main ways to detect finger touch locations are, for example, optical type, capacitive type and ultrasonic imaging type touch recognition technologies. Optical touch recognition technologies have advantages of relatively large recognition range and relatively low cost, and therefore, optical touch recognition technologies are favored by major panel manufacturers.

SUMMARY

The embodiments of the present disclosure provides a touch display panel, a fingerprint recognition device and a display device, the embodiments of the present disclosure provide an optical type touch recognition technology.

The touch display panel provided by an embodiment of the present disclosure includes: a waveguide plate and a lower substrate opposite to each other, a liquid crystal layer and an electrode structure between the waveguide plate and the lower substrate, a reflective layer at a side of the lower substrate facing toward the liquid crystal layer, and a plurality of photosensitive units at the side of the lower substrate facing toward the liquid crystal layer, or at a side of the waveguide plate facing toward the liquid crystal layer. The electrode structure is configured to control a refractive index of liquid crystal molecules in the liquid crystal layer, so as to allow light to be emitted out from a lower surface of the waveguide plate closer to the liquid crystal layer, or to allow the light to be totally reflected inside the waveguide plate.

In one possible implementation, in the touch display panel provided by the embodiments of the present disclosure, the touch display panel includes a plurality of grating structures spaced apart from each other, and the grating structures are in contact with the liquid crystal layer; the electrode structure is configured to control a relationship between the refractive index of the liquid crystal molecules in the liquid crystal layer and a refractive index of a grating structure, so as to allow the light to be emitted out from the lower surface of the waveguide plate, or to allow the light to be totally reflected at the lower surface of the waveguide plate.

In one possible implementation, in the touch display panel provided by the embodiments of the present disclosure, a refractive index of each of the grating structures is in a range of [no, ne], in which, no is a refractive index of the liquid crystal molecules in the liquid crystal layer for o-polarized light, ne is a refractive index of the liquid crystal molecules in the liquid crystal layer for e-polarized light.

In one possible implementation, in the touch display panel provided by the embodiments of the present disclosure, the grating structures are reflective grating structures, each of the reflective grating structures includes a plurality of grating stripes spaced apart from each other and grating gaps, each of the grating gaps is between two adjacent grating stripes.

In one possible implementation, in the touch display panel provided by the embodiments of the present disclosure, the reflective layer includes a plurality of reflective structures spaced apart from each other, and the reflective structures serve as the reflective grating structures.

In one possible implementation, in the touch display panel provided by the embodiments of the present disclosure, the electrode structure includes: first electrode structures which are at a side of the reflective grating structures facing toward the liquid crystal layer, and are in one-to-one correspondence with the reflective grating structures, and a second electrode structure at the side of the waveguide plate facing toward the liquid crystal layer.

In one possible implementation, in the touch display panel provided by the embodiments of the present disclosure, an emission efficiency of the light emitted out from the lower surface of the waveguide plate decreases along with an increase of a difference between the refractive index of the liquid crystal molecules in the liquid crystal layer and a refractive index of the waveguide plate.

In one possible implementation, in the touch display panel provided by the embodiments of the present disclosure, the plurality of grating structures are a plurality of transmissive grating structures at the side of the waveguide plate facing toward the liquid crystal layer.

In one possible implementation, in the touch display panel provided by the embodiments of the present disclosure, in a case where the refractive index of the liquid crystal molecules in the liquid crystal layer is equal to the refractive index of the grating structure, the light is totally reflected at the lower surface of the waveguide plate closer to the liquid crystal layer; and in a case where the refractive index of the liquid crystal molecules in the liquid crystal layer is not equal to the refractive index of the grating structure, the light is at least partially emitted out from the lower surface of the waveguide plate closer to the liquid crystal layer.

In one possible implementation, in the touch display panel provided by the embodiments of the present disclosure, the electrode structure includes first electrode structures, and the first electrode structures are at a side of the transmissive grating structures facing toward the liquid crystal layer and are in one-to-one correspondence with the transmissive grating structures.

In one possible implementation, in the touch display panel provided by the embodiments of the present disclosure, the electrode structure further includes a second electrode structure, the second electrode structure includes second sub-electrode structures, the second sub-electrode structures are at the side of the lower substrate facing toward the liquid crystal layer, and are in one-to-one correspondence with the transmissive grating structures.

In one possible implementation, in the touch display panel provided by the embodiments of the present disclosure, the photosensitive units are each in a gap between two adjacent second sub-electrode structures.

In one possible implementation, in the touch display panel provided by the embodiments of the present disclosure, the reflective layer is between the lower substrate and a layer where the second sub-electrode structures are located.

In one possible implementation, the touch display panel provided by the embodiments of the present disclosure further includes: an alignment layer at the side of the waveguide plate facing toward the liquid crystal layer and/or an alignment layer at the side of the lower substrate facing toward the liquid crystal layer.

In one possible implementation, in the touch display panel provided by the embodiments of the present disclosure, an initial orientation of the liquid crystal molecules in the liquid crystal layer is perpendicular to the waveguide plate and the lower substrate.

In one possible implementation, in the touch display panel provided by the embodiments of the present disclosure, the electrode structure includes a plurality of first electrode structures spaced apart from each other, and includes a second electrode structure, and a layer where the first electrode structures are located and a layer where the second electrode structure is located are opposite to each other.

In one possible implementation, in the touch display panel provided by the embodiments of the present disclosure, the grating structures are in one-to-one correspondence with the first electrode structures.

The embodiments of the present disclosure further provides a display device, which includes the touch display panel provided by any one of the above-mentioned embodiments, and a collimated light source on at least one side edge of the waveguide plate, collimated light emitted out by the collimated light source is incident onto the waveguide plate at an incident angle satisfying a total reflection condition of the waveguide plate.

In one possible implementation, in the display device provided by the embodiments of the present disclosure, the incident angle is greater than or is equal to $\arcsin(n_0/n_1)$; in which $n_0$ is a refractive index of air, and m is a refractive index of the waveguide plate.

At least one embodiment of the present disclosure provides a fingerprint recognition device, which includes: a waveguide plate and a lower substrate opposite to each other, a liquid crystal layer and an electrode structure between the waveguide plate and the lower substrate, a reflective layer at a side of the lower substrate facing toward the liquid crystal layer, and a plurality of photosensitive units at the side of the lower substrate facing toward the liquid crystal layer, or at a side of the waveguide plate facing toward the liquid crystal layer. The electrode structure is configured to control a refractive index of liquid crystal molecules in the liquid crystal layer, so as to allow light to be emitted out from a lower surface of the waveguide plate closer to the liquid crystal layer, or to allow the light to be totally reflected inside the waveguide plate.

In one possible implementation, in the fingerprint recognition device provided by the embodiments of the present disclosure, the fingerprint recognition device includes a plurality of grating structures spaced apart from each other, and the grating structures are in contact with the liquid crystal layer; and the electrode structure is configured to control a relationship between the refractive index of the liquid crystal molecules in the liquid crystal layer and a refractive index of a grating structure, so as to allow the light to be emitted out from the lower surface of the waveguide plate, or to allow the light to be totally reflected at the lower surface of the waveguide plate.

In one possible implementation, in the fingerprint recognition device provided by the embodiments of the present disclosure, the fingerprint recognition device further includes a memory, which is configured to store first light intensities detected by a photosensitive unit at each of positions in different grayscales when the fingerprint recognition device only performs fingerprint recognition; a calculator, which is configured to calculate differences between second light intensities, which are detected by the photosensitive unit at the each of the positions when the fingerprint recognition device simultaneously performs the fingerprint recognition and display, and the first light intensities, and to obtain a fingerprint according to the differences.

In one possible implementation, in the fingerprint recognition device provided by the embodiments of the present disclosure, the fingerprint recognition device further includes a controller, which is configured to control a fingerprint recognition region to display under a single grayscale signal when performing the fingerprint recognition.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Specific implementations of the touch display panel, the fingerprint recognition device and the display device provided by the embodiments of the present disclosure are described in detail in the following with reference to accompanying drawings.

The shapes and the sizes of the film layers are intended to describe the content of the present disclosure illustratively, and not intended to represent a real scale of the display device.

Figure 1A:
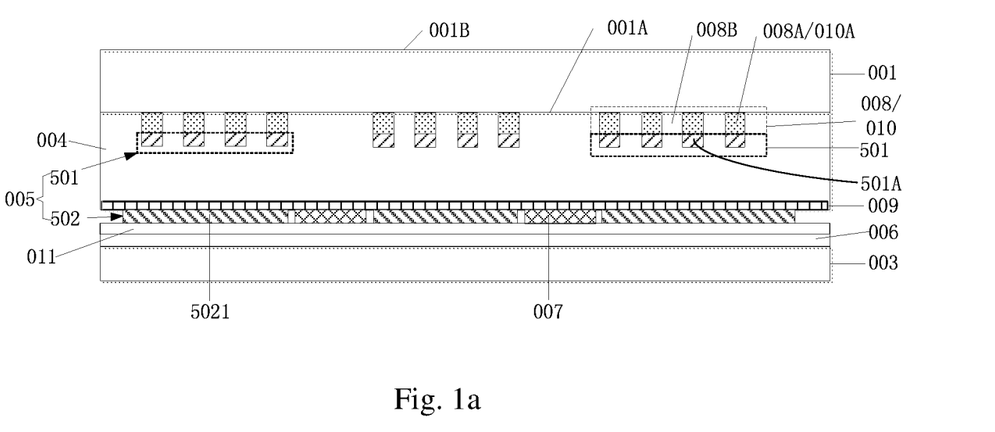
FIG. 1a to FIG. 1d are respectively schematic structural diagrams of a touch display panel provided by an embodiment of the present disclosure.
Figure 1B:
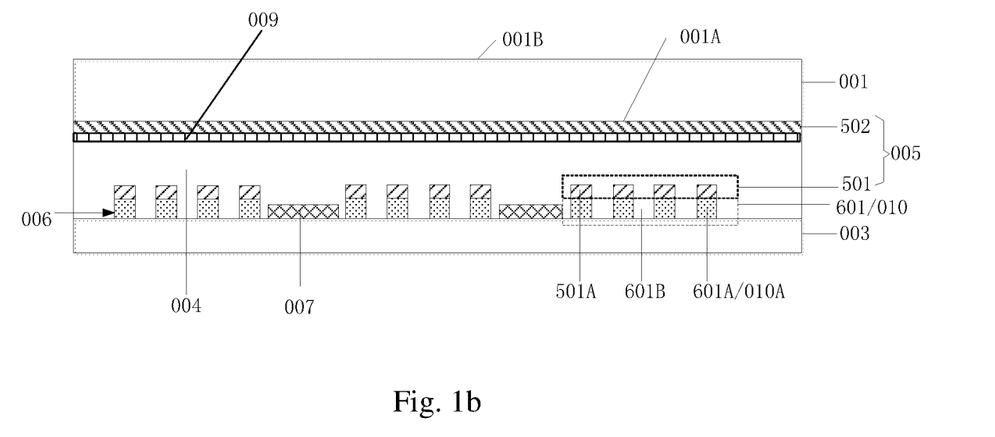
Figure 1C:
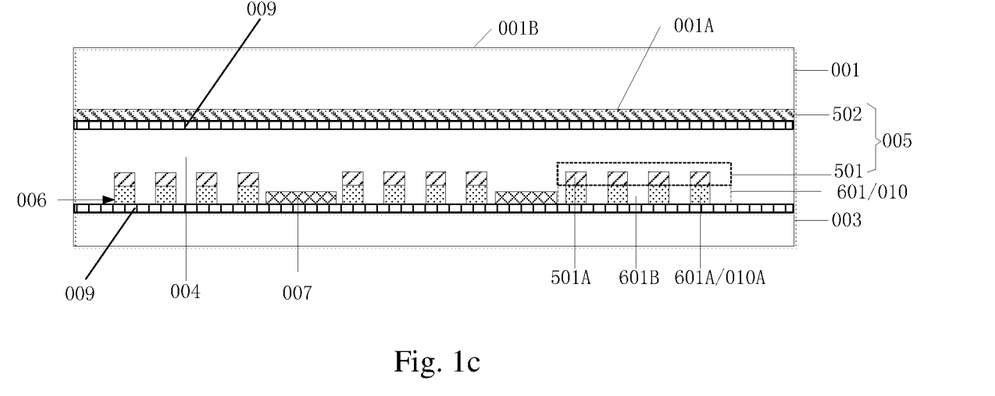

At least one embodiment of the present disclosure provides a touch display panel, as illustrated in FIG. 1a to FIG. 1c, the touch display panel includes: a waveguide plate 001 and a lower substrate 003 which are opposite to each other; a liquid crystal layer 004 and an electrode structure 005 which are between the waveguide plate 001 and the lower substrate 003; a reflective layer 006 at a side, which faces toward the liquid crystal layer 004, of the lower substrate 003; a plurality of photosensitive units 007 (for example, photosensitive sensors) at a side, which faces toward the liquid crystal layer 004, of the lower substrate 003, or at a side, which faces toward the liquid crystal layer 004, of the waveguide plate 001. In the touch display panel, the electrode structure 005 is configured to control a refractive index of liquid crystal molecules in the liquid crystal layer 004, so as to allow light to be emitted out from the lower surface 001A, which is closer to the liquid crystal layer 004, of the waveguide plate 001 or to allow the light to be totally reflected inside the waveguide plate 001.

For example, as illustrated in FIG. 1a to FIG. 1d, the touch display panel further includes an alignment layer 009 at the side, which faces toward the liquid crystal layer 004, of the waveguide plate 001 and/or an alignment layer 009 at the side, which faces toward the liquid crystal layer 004, of the lower substrate 003.

For example, as illustrated in FIG. 1a to FIG. 1d, the electrode structure 005 includes a plurality of first electrode structures 501 which are spaced apart from each other, and includes a second electrode structure 502, and a layer where the first electrode structures 501 are located is arranged opposite to and a layer where the second electrode structure 502 is located.

Figure 1D:
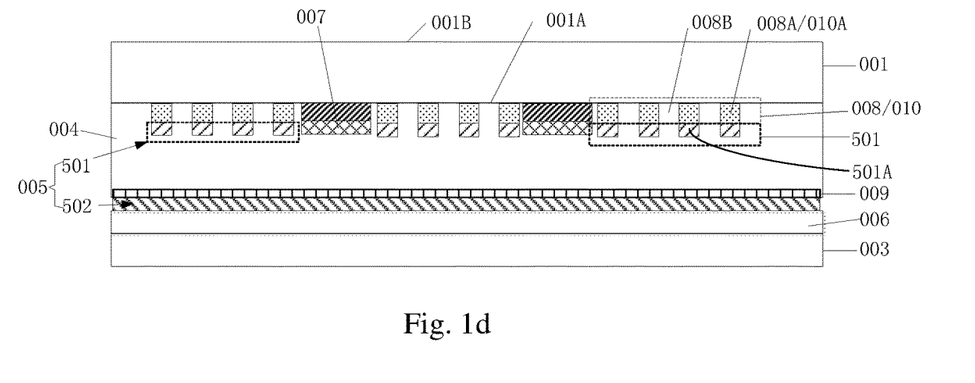

For example, as illustrated in FIG. 1a and FIG. 1d, the plurality of first electrode structures 501 and the second electrode structure 502 are respectively at two sides of the liquid crystal layer.

For example, as illustrated in FIG. 1a to FIG. 1d, each of the first electrode structures 501 includes a plurality of electrode stripes 501A, and gaps are provided between the electrode stripes 501A.

For example, as illustrated in FIG. 1a, the second electrode structure 502 includes a plurality of second sub-electrodes 5021 which are spaced apart from each other. For example, the second sub-electrodes 5021 are in one-to-one correspondence with the first electrode structures 501, that is to say, each of the second sub-electrodes 5021 corresponds to one first electrode structure 501, and each of the first electrode structures 501 corresponds to one second sub-electrode 5021.

For example, as illustrated in FIG. 1b to FIG. 1d, the second electrode structure 502 is a structure which is continuously formed, and the structure which is continuously formed corresponds to the plurality of first electrode structures 501.

For example, as illustrated in FIG. 1a to FIG. 1d, the touch display panel further includes a plurality of grating structures 010 which are spaced apart from each other, the grating structures 010 are in direct contact with the liquid crystal layer 004, the electrode structure 005 is configured to control a relationship between the refractive index of the liquid crystal molecules in the liquid crystal layer 004 and a refractive index of a grating structure 010, so as to allow the light to be emitted out from the lower surface 001A of the waveguide plate 001 or to allow the light to be totally reflected at the lower surface 001A of the waveguide plate 001.

It should be noted that, in the embodiments as illustrated in FIG. 1b and FIG. 1c, an evanescent field exists at the lower surface 001A of the waveguide plate 001, as long as the grating structure 010 is located within evanescent field, it is achieved that the light is emitted out from the inside of the waveguide plate 001 or the light is totally reflected inside the waveguide plate 001 through changing the relationship between the refractive index of the grating structure 010 and the refractive index of the liquid crystal layer 004. In the embodiment as illustrated in FIG. 1d, the photosensitive unit 007 is at the side, which faces toward the liquid crystal layer 004, of the waveguide plate 001, a filler layer is provided between the photosensitive unit 007 and the waveguide plate 001, as long as a refractive index of the filler layer satisfies a condition that the total reflection of the light in the waveguide plate 001 at the lower surface 001A of the waveguide plate 001 is not destroyed.

For example, as illustrated in FIG. 1a to FIG. 1d, the plurality of grating structures 010 are in one-to-one correspondence with the plurality of first electrode structures 501. In this case, each of the grating structures 010 corresponds to one first electrode structure 501, each of the first electrode structures 501 corresponds to one grating structure 010, and orthographic projections of a grating structure 010 and a first electrode structure 501, which correspond to each other, on the waveguide plate 001 overlap.

For example, each of the grating structures 010 includes a plurality grating stripes 010A, the grating stripes 010A are in one-to-one correspondence with the electrode stripes 501A. In this case, each of the grating stripes 010A corresponds to one electrode stripe 501A, each of the electrode stripes 501A corresponds to one grating stripe 010A, and orthographic projections of a grating stripe 010A and a electrode stripe 501A, which correspond to each other, on the waveguide plate 001 overlap.

For example, as illustrated in FIG. 1a to FIG. 1d, in an arrangement direction of the plurality of grating structures

010, a width of a gap between adjacent grating structures 010 is greater than a width of a gap between adjacent grating stripes 010A included by each of the grating structures 010.

For example, as illustrated in FIG. 1*a* to FIG. 1*d*, in the arrangement direction of the plurality of grating structures 010, an orthographic projection of each of the photosensitive units 007 on the lower substrate 003 is between the orthographic projections of adjacent grating structures 010 on the lower substrate 003. For example, as illustrated in FIG. 1*a* and FIG. 1*d*, in the case where the grating structures 010 are at the side, which faces toward the liquid crystal layer 004, of the waveguide plate 001, the grating structures 010 are transmissive grating structures 008, the transmissive grating structures 008 includes grating stripes 008A which are capable of allowing light to pass through, and grating gaps 008B, each of the grating gaps 008B is between adjacent grating stripes 008A.

For example, as illustrated in FIG. 1*b* and FIG. 1*c*, in the case where the grating structures 010 are at the side, which faces toward the liquid crystal layer 004, of the lower substrate 003, the plurality of reflective structures 601 included by the reflective layer 006 serve as the plurality of grating structures 010, each of the reflective structures 601 includes grating stripes 601A which are able to reflect light and grating gaps 601B, each of the grating gaps 601B is between adjacent grating stripes 601A.

Figure 1E:
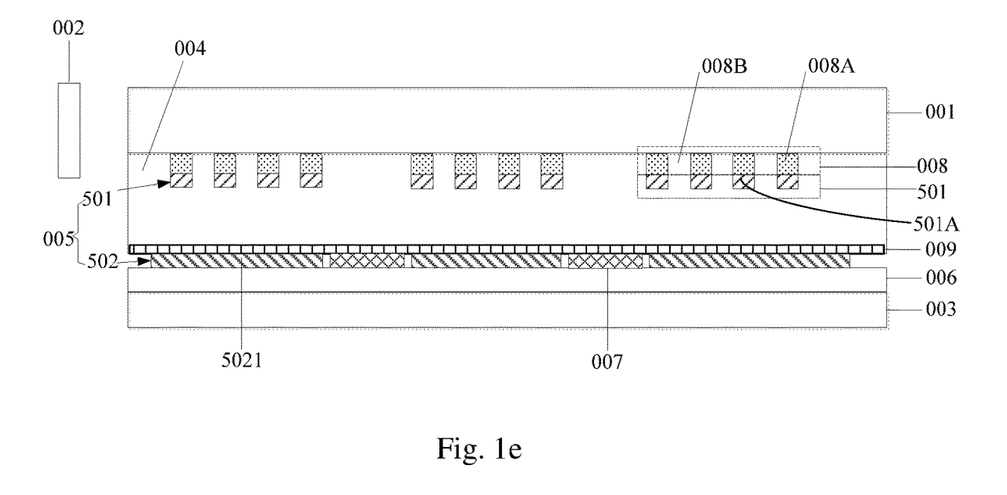
FIG. 1e and FIG. 1f are respectively schematic structural diagrams of a display device provided by an embodiment of the present disclosure.
Figure 1F:
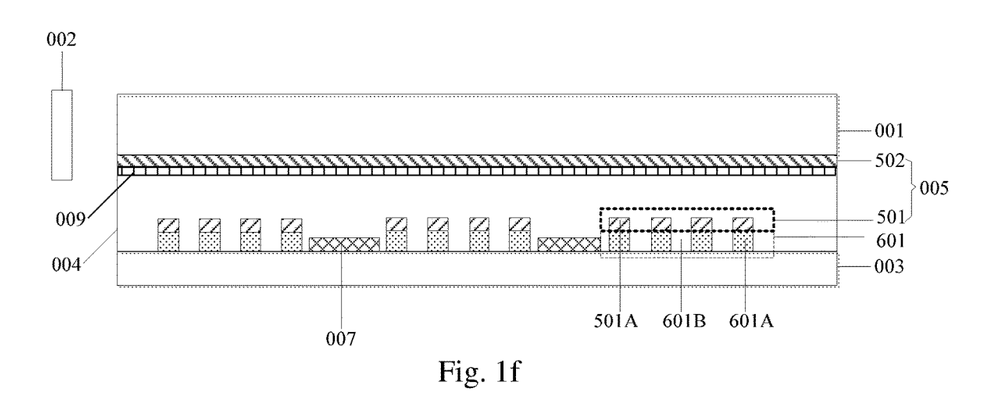

At least one embodiments of the present disclosure provides a display device, which includes the touch display panel provided by at least one embodiment of the present disclosure, besides that, as illustrated in FIG. 1*e* and FIG. 1*f*, the display device further includes a collimated light source 002 which is disposed on at least one side edge of the waveguide plate 001, collimated light emitted out by the collimated light source 002 is incident onto the waveguide plate 001 at an incident angle satisfying total reflection condition of the waveguide plate 001.

Figure 2:
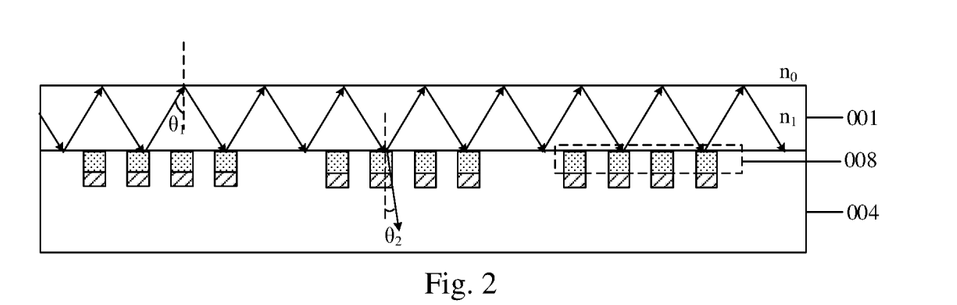
FIG. 2 is a schematic diagram illustrating an optical path in a waveguide plate provided by an embodiment of the present disclosure.

For example, in the display device provided by an embodiment of the present disclosure, as illustrated in FIG. 2, a condition that the light is totally reflected at an interface between the waveguide plate 001 and the air at a display side of the touch display panel is: $n_1 \sin \theta_1 = n_0 \sin \theta_0$, and it can be deduced that the incident angle when the total reflection begins to occur (that is, when $\theta_0$ is equal to 90 degrees) is $\theta_1 = \arcsin(n_0/n_1)$; in which $n_1$ is the refractive index of the waveguide plate 001, $n_0$ is the refractive index of air, $\theta_1$ is an angle between an incident ray and a normal line of an upper surface of the waveguide plate 001, $\theta_0$ is an angle between a refractive ray and the normal line of the upper surface of the waveguide plate 001; by this way, as long as the angle between the incident ray and the normal line of the upper surface of the waveguide plate 001 is controlled to be greater than or equal to $\theta_1$, that is, to be greater than or equal to $\arcsin(n_0/n_1)$, it can be achieved that the light is totally reflected at the interface between the waveguide plate 001 and the air at the display side of the touch display panel.

In the touch display panel and the display device provided by the embodiments of the present disclosure, during normal display, by changing a voltage applied to the liquid crystal layer 004 by the electrode structure 005, the refractive index of the liquid crystal molecules in the liquid crystal layer 004 is controlled to be changed, so that the light propagated in the waveguide plate 001 is allowed to be emitted out from the lower surface 001A, which is closer to the liquid crystal layer 004, of the waveguide plate 001, to pass through the liquid crystal layer 004 and to be incident onto the reflective layer 006 and the photosensitive unit 007, further, the light is reflected by the reflective layer 006, to implement emitting out of the light at the side, where the waveguide plate 001 is located, of the touch display panel, thereby achieving display at one side of the waveguide plate 001. During touching the waveguide plate 001, the light which is reflected by the reflective layer 006 and emitted out from the upper surface 001B of the waveguide plate 001 (that is, the surface of the waveguide plate 001 away from the liquid crystal layer 004) is diffusely reflected at a touch position by a finger to the photosensitive unit 007; and, the finger causes total reflection state of the upper surface 001B of the waveguide plate 001 to be unable to be maintained, such that part of the light at the upper surface 001B is emitted from the upper surface 001B of the waveguide plate 001 to outside of the touch display panel, and the remaining other part of the light at the upper surface 001B is emitted out to the photosensitive units 007 from the lower surface 001A, which is closer to the liquid crystal layer 004, of the waveguide plate 001. It can be seen that the light received by the photosensitive unit 007 includes two portions as mentioned above, so that the photosensitive units 007 can determine touch positions according to the energy difference between the light received under the condition of touch and the light received under the condition of normal display. Therefore, the embodiments of the present disclosure has a relatively high touch recognition accuracy rate. In the case where it is applied in the fingerprint recognition, the embodiments of the present disclosure has a relatively high fingerprint recognition accuracy rate.

For example, a material of the reflective layer 006 is a metal with high reflectivity. By this way, in the case where the photosensitive unit 007 is integrated onto the lower substrate 003 or the waveguide plate 001, the aperture ratio of the touch display pane is not affected, such that the aperture ratio of the touch display panel is guaranteed while the touch function is implemented.

Figure 3:
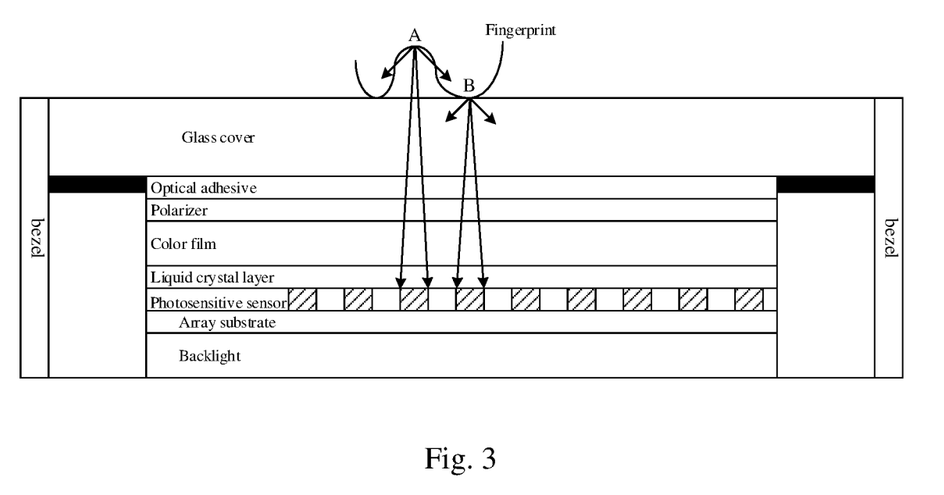
FIG. 3 is a schematic diagram illustrating a principle of one type of fingerprint recognition.

In the liquid crystal display device as illustrated in FIG. 3, the photosensitive sensors in the liquid crystal display device not only can be used to achieve the touch position detection, but also can further achieve to determine fingerprint textures. For example, as illustrated in FIG. 3, after the light emitted by a backlight sequentially passes through the liquid crystal layer, a color film and a polarizer, and is incident on the finger, the light is diffusely reflected at a pressing position on the display panel by the finger, part of diffusion light is received by the photosensitive sensors on an array substrate after the part of diffusion light passes through the polarizer, the color film and the liquid crystal layer again, and the fingerprint recognition is performed according to the difference between the beam energy of light diffusely reflected at a valley A of a fingerprint of a finger and the beam energy of light diffusely reflected at a ridge B of the fingerprint of the finger.

In light of this, in the above-mentioned touch display panel and display device provided by the embodiments of the present disclosure, the touch display panel and the display device have a function of recognizing touch and/or a function of recognizing a fingerprint texture by utilizing the photosensitive units (for example, the photosensitive sensors) 007. For example, when the finger presses the waveguide plate 001, part of the light beam which is incident onto the region, which corresponds to the ridge of the fingerprint, of the waveguide plate 001 is allowed to be emitted out from the region of the waveguide plate 001 corresponding to the ridge of the fingerprint due to the existence of the epidermal layer of the finger, the remaining part of the light beam is emitted out to the photosensitive unit 007 from the region of the waveguide plate 001 corresponding to the ridge of the fingerprint; because the light beam which is incident onto the region of the waveguide plate 001 corresponding to the valley of the fingerprint is in contact with air, all the light beam is emitted from the region of the waveguide plate 001 corresponding to the valley of the fingerprint to the photosensitive unit 007, and therefore, the fingerprint recognition is, for example, achieved according to a large energy difference between the light beams which are emitted out from the region of the waveguide plate 001 corresponding to the ridge of the fingerprint and the region of the waveguide plate 001 corresponding to the valley of the fingerprint to the photosensitive unit 007.

It is, for example, concluded from the above-mentioned descriptions that, in the liquid crystal display device as illustrated in FIG. 3, recognition of the fingerprint is implemented through part of the light beam which is diffusely reflected by the valley or the ridge of the fingerprint of the finger and received by the photosensitive sensor; because the light beam which is diffusely reflected by the valley or the ridge of the fingerprint of the finger may be simultaneously received by a plurality of photosensitive sensors, cross talk is caused, and the accuracy of the fingerprint recognition is adversely affected. In the above-mentioned touch display panel and display device provided by the embodiments of the present disclosure, the fingerprint recognition is achieved through the difference between the light beams which are directly emitted out from the region of the waveguide plate 001 corresponding to the valley of the fingerprint of the finger or the region of the waveguide plate 001 corresponding to the ridge of the fingerprint of the finger, and are incident onto the photosensitive unit 007, and therefore, the influence of cross-talk can be reduced, and the accuracy of the fingerprint recognition is increased.

For better understanding the technical solution of the embodiments of the present disclosure, the touch display panel and the display device provided by the embodiments of the present disclosure are described in detail with reference to specific embodiments. Moreover, in the following specific embodiments, all of descriptions are given by taking the case that the photosensitive units are on the lower substrate and are capable of implementing the fingerprint recognition as an example.

The touch display panel and the display device provided by at least one embodiment of the present disclosure, as illustrated in FIG. 1a, FIG. 1d and FIG. 1e, include: the waveguide plate 001 and the lower substrate 003 which are opposite to each other, the liquid crystal layer 004 and the electrode structure 005 which are between the waveguide plate 001 and the lower substrate 003, the reflective layer 006 at the side, which faces toward the liquid crystal layer 004, of the lower substrate 003 (for example, the reflective layer 006 and the lower substrate 003 are in direct contact), and the plurality of photosensitive units 007 (for example, the photosensitive units 007 are in direct contact with the reflective layer 006) at the side, which faces toward the liquid crystal layer 004, of the lower substrate 003. In the touch display panel, the electrode structure 005 is configured to control the refractive index of the liquid crystal molecules in the liquid crystal layer 004, so as to allow the light which is incident from a side surface of the waveguide plate 001 to be emitted out from the lower surface 001A, which is closer to the liquid crystal layer 004, of the waveguide plate 001 or allow the light which is incident from the side surface of the waveguide plate 001 to be totally reflected inside the waveguide plate 001.

For example, in a specific implementation, in order to achieve color display, in the touch display panel and the display device provided by at least one embodiment of the present disclosure, as illustrated in FIG. 1a, FIG. 1d and FIG. 1e, a plurality of transmissive grating structures 008, which are at the side, which faces toward the liquid crystal layer 004, of the waveguide plate 001, and are in direct contact with the liquid crystal layer 004, may be further included, a refractive index of each of the transmissive grating structures 008 is in the range of [no,ne]; in which no is the refractive index of the liquid crystal molecules in the liquid crystal layer 004 for o-polarized light, ne is the refractive index of the liquid crystal molecules in the liquid crystal layer 004 for e-polarized light. In this case, the function of the transmissive grating structures 008 is: to choose a light ray with a preset color (the wavelength of the light is $\lambda$) from the light ray (the light ray is mixed light ray of light rays of a plurality of colors) propagated in the waveguide plate 001, and to allow the chosen light ray with the preset color to be emitted out toward a preset direction (the angle between the preset direction and the normal line of the lower surface of the waveguide plate 001 is $\theta_2$), as illustrated in FIG. 2. Therefore, one transmissive grating structure 008 corresponds to one sub-pixel structure in the display device.

For example, in the touch display panel and the display device provided by at least one embodiment of the present disclosure, the wavelength $\lambda$ of light, which is coupled by the transmissive grating structure 008 from the waveguide plate 001 and has a controllable light exiting direction, and the grating period $\Lambda$ of the transmissive grating structure 008 (that is, the distance between the centers of adjacent transmissive grating structures 008) satisfy the following equation:

$$n_1 \sin \theta_1 - n_{\text{eff}} \sin \theta_2 = m\lambda/\Lambda (m=0, \pm 1, \pm 2, \alpha)$$

In which, as illustrated in FIG. 2, $n_1$ is the refractive index of the waveguide plate 001, $\theta_1$ is the angle between the incident ray and the normal line of the upper surface of the waveguide plate 001; $n_{\text{eff}}$ is the effective refractive index of the transmissive grating structure 008; $\theta_2$ is the angle between a coupled-light-exiting direction and the normal line of the lower surface of the waveguide plate 001. It can be seen that, the light beam which is coupled from the waveguide plate 001 and has a controllable light-exiting direction and a controllable color can be controlled through adjusting the grating period $\Lambda$ of the transmissive grating structure 008 and the incident angle of the incident ray.

In addition, in the case where the incident ray or an emitting ray satisfies the phase matching relationship of the equation $\beta_q = \beta_m - qK(q=0, \pm 1, \pm 2, \ldots)$, the incident ray is, for example, excites m order guided mode in the waveguide plate 001 or the m order guided mode is, for example, coupled out in a given direction. In the equation, $\beta_q = \beta_m - qK(q=0, \pm 1, \pm 2, \ldots)$, $\beta_m$ is the propagation constant of the m order guided mode, $\beta_m = k_0 N_m$, $N_m$ is the effective refractive index of the m order guided mode, K is a grating vector, $K=2\pi/\Lambda$, $\Lambda$ is the grating period.

It is assumed that the angle between the wave vector direction of the emitting ray and an vertical direction is $\theta_2$, and the above-mentioned phase matching relationship can be further represented by: $k_0 n_3 \sin \theta_2 = k_0 N_m \sin \theta_1 - q2\pi/\Lambda$ $(q=0, \pm 1, \pm 2, \ldots)$, the incident ray which satisfies the above-mentioned expression can achieve the technical effect of light outputting at a single surface, which indicates that the incident ray is totally reflected at the upper interface of the waveguide plate 001 (that is, the interface between the waveguide plate 001 and air), and light is coupled out at the interface between the waveguide plate 001 and the transmissive grating structure 008.

For example, in the touch display panel and the display device in at least one embodiment of the present disclosure, the electrode structure 005 is configured to control the liquid crystal molecules corresponding to respective sub-pixel structures to rotate, so as to achieve controlling of display grayscales. Based on this, in a specific implementation, the electrode structure 005 can be achieved through, but not limited to, the following implementations.

For example, the electrode structure 005 may include: the first electrode structures 501 which are at the side, which faces toward the lower substrate 003, of the transmissive grating structures 008, and are in one-to-one correspondence with the transmissive grating structures 008; and the second electrode structure 502 which is at the side, which faces toward the liquid crystal layer 004, of the lower substrate 003, as illustrated in FIG. 1a, FIG. 1d and FIG. 1e.

For another example, the electrode structure 005 may also include: the first electrode structures 501 which are at the side, which faces toward the lower substrate 003, of each of the transmissive grating structures 008, and are in one-to-one correspondence with the transmissive grating structures 008, and the second electrode structure 502 which is between the waveguide plate 001 and the layer where the transmissive grating structures 008 are located.

For further another example, the electrode structure 005 may further includes: the first electrode structures 501 which are between the layer where the transmissive grating structures 008 are located and the waveguide plate 001, and are in one-to-one correspondence with the transmissive grating structures 008; and the second electrode structure 502 which is at the side, which faces toward the transmissive grating structures 008, of the lower substrate 003.

For example, in the touch display panel and the display device provided by at least one embodiment of the present disclosure, the second electrode structure 502 may comprise a plurality of second sub-electrode structures 5021 which are in one-to-one correspondence with the first electrode structures 501, as illustrated in FIG. 1a and FIG. 1e.

For example, in the case where the plurality of second sub-electrode structures 5021 are at the side, which faces toward the liquid crystal layer 004, of the lower substrate 003, and are in one-to-one correspondence with the transmissive grating structures 008, each of the photosensitive units 007 may be in a gap between two adjacent second sub-electrode structures 5021. For example, as illustrated in FIG. 1a and FIG. 1e, the photosensitive units 007 and the second sub-electrode structures 5021 are arranged side by side on the reflective layer 006. For example, the respective second sub-electrode structures 5021 and the respective photosensitive units 007 are in the same layer, such that the thickness of the touch display panel can be reduced, and light and thin design is achieved.

For example, in the touch display panel and the display device provided by at least one embodiment of the present disclosure, the transmissive grating structures 008 can be achieved through the following ways. For example, as illustrated in FIG. 1a, FIG. 1d and FIG. 1e, the transmissive grating structure 008 includes the plurality of grating stripes 008A which are spaced apart from each other, and the grating gaps 008B, each of the grating gaps 008B is between corresponding two adjacent grating stripes.

To make it easier to design the first electrode structure 501, in a specific implementation, for example, as illustrated in FIG. 1a, FIG. 1d and FIG. 1e, the first electrode structure 501 may include: a plurality of electrode stripes 501A corresponding to the grating stripes 008A in the transmissive grating structure 008, that is, the electrode stripes 501A are respectively at the positions where the grating stripes 008A are located, so that the transmissive grating structures 008 and the first electrode structures 501 constitute laminated composite structures; and the width of the electrode stripe is not greater than the width of the grating stripe, for example, the width of the electrode stripe 501A in a direction in which the electrode stripes 501A are arranged may be equal to the width of the grating stripe 008A in the direction in which the electrode stripes 501A are arranged.

For example, in the touch display panel and the display device provided by at least one embodiment of the present disclosure, as illustrated in FIG. 1a, FIG. 1d and FIG. 1e, in the case where the second electrode structure 502 and the reflective layer 006 are both located on the lower substrate 003, the reflective layer 006 may be located between the lower substrate 003 and the layer where the second electrode structure 502 is located.

For example, in order to prevent the signals on the reflective layer 006 and the second electrode structure 502 from interfering with each other, the touch display panel and the display device provided by at least one embodiment of the present disclosure, as illustrated in FIG. 1a, may further include: an insulation layer 011 between the reflective layer 006 and the layer where the second electrode structure 502 is located.

For example, in the touch display panel and the display device provided by at least one embodiments of the present disclosure, at least one alignment layer 009 may further be included. For example, the alignment layer 009 is at the side, which faces toward the liquid crystal layer 004, of the lower substrate 003, as illustrated in FIG. 1a and FIG. 1e; or, the alignment layer 009 may also be disposed at the side, which faces toward the liquid crystal layer 004, of the waveguide plate 001; or, for further another example, the side, which faces toward the liquid crystal layer 004, of the waveguide plate 001 and the side, which faces toward the liquid crystal layer 004, of the lower substrate 003 are respectively provided with one alignment layer 009. That is, the upper surface of the liquid crystal layer 004 is provided with one alignment layer 009, or the lower surface of the liquid crystal layer 004 is provided with one alignment layer 009, or the upper and lower surfaces of the liquid crystal layer 004 are respectively provided with one alignment layer 009, so as to control an initial orientation of the liquid crystal molecules in the liquid crystal layer 004 to be perpendicular to the waveguide plate 001 and the lower substrate 003.

In the case where the change of the refractive index of the liquid crystal molecules in the liquid crystal layer 004 is controlled through a vertical electrical filed formed by the electrode structure 005 as illustrated in FIG. 1a and FIG. 1e, only the e-polarized light, a vibration direction of which is in the interface (that is, a cross-sectional plane as illustrated in FIG. 1a and FIG. 1e, the cross-sectional plane is a plane where the arrangement direction of the first electrode structures 501 and the arrangement direction of the waveguide plate 001 and the lower substrate 003 are located) as illustrated in FIG. 1a and FIG. 1e, can sense the above-mentioned change of the refractive index, and the o-polarized light, a vibration direction of which is perpendicular to the interface (that is, is perpendicular to the arrangement direction of the first electrode structures 501 and the arrangement direction of the waveguide plate 001 and the lower substrate 003) as illustrated in FIG. 1a and FIG. 1e, is unable to sense the above-mentioned change of the refractive index, such that disposing of polarizers at the light incident side and the light exit side of the liquid crystal layer 004 can be avoided, therefore, the transmittance of the touch display panel can be improved, and the accuracy of the fingerprint recognition is increased.

The principle that the above-mentioned touch display panel and display device provided by the embodiments of the present disclosure achieve functions of normal display and the fingerprint recognition is described in detail in the following.

In a specific implementation, the vertical electrical field acting on the liquid crystal layer 004 is adjusted by adjusting the voltage applied by the electrode structure 005 as illustrated in FIG. 1a and FIG. 1e, thus it can be achieved that the liquid crystal molecules in the liquid crystal layer 004 are rotated in the cross-sectional plane illustrated in FIG. 1a and FIG. 1e, so as to implement the change of the refractive index of the liquid crystal molecules in the liquid crystal layer 004 between no and ne, and achieve different grayscales; in which no is the refractive index of the liquid crystal molecules in the liquid crystal layer 004 for the o-polarized light, ne is the refractive index of the liquid crystal molecules in the liquid crystal layer 004 for the e-polarized light.

For example, for the display device as illustrated in FIG. 1e, in the case where the refractive index of the liquid crystal molecules in the liquid crystal layer 004 is equal to the refractive index of the grating structure 010, the light is totally reflected at the lower surface 001A, which is closer to the liquid crystal layer 004, of the waveguide plate 001; in the case where the refractive index of the liquid crystal molecules in the liquid crystal layer 004 is not equal to the refractive index of the grating structure 010, the light is at least partially emitted out from the lower surface 001A, which is closer to the liquid crystal layer 004, of the waveguide plate 001. By taking the case where the refractive index of the transmissive grating structure 008 is equal to no as an example, in the case where the refractive index of the liquid crystal layer 004 and the refractive index of the transmissive grating structure 008 are equal (that is, are both equal to no), the effect of the transmissive grating structure 008 is covered, and no light is coupled out from the waveguide plate 001, which is a L0 state in this case; in the case where the difference between the refractive index (ne) of the liquid crystal layer 004 and the refractive index (no) of the transmissive grating structure 008 is maximum, the effect of the transmissive grating structure 008 is most apparent, the coupling efficiency of the light coupled from the waveguide plate 001 is the highest, which is a L255 state in this case; in the case where the refractive index of the liquid crystal layer 004 is between the above-mentioned two cases, it is in a state with other grayscale. In addition, because only the e-polarized light, the vibration direction of which is in the interface as illustrated in FIG. 1e, is able to sense the above-mentioned change of the refractive index, and the o-polarized light, the vibration direction of which is perpendicular to the interface as illustrated in FIG. 1e, is unable to sense the above-mentioned change of the refractive index, therefore, the light coupled from the waveguide plate 001 by the transmissive grating structures 008 is the e-polarized light.

Figure 4:
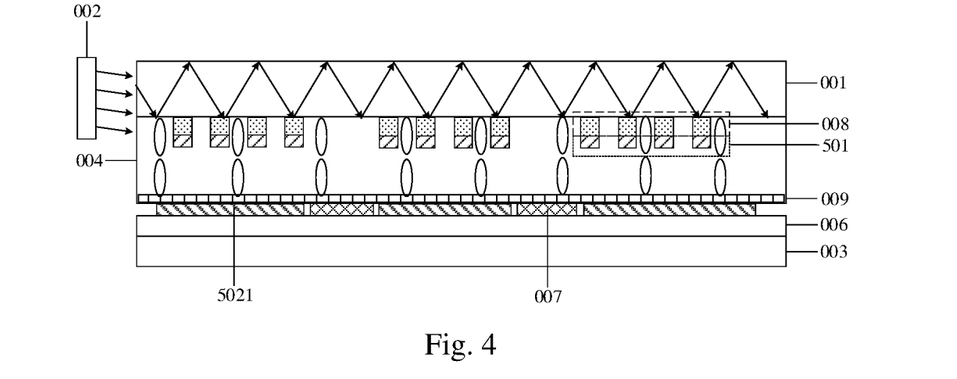
FIG. 4 is a schematic diagram of the display device which is illustrated in FIG. 1e and displays a L0 gray scale.
Figure 5:
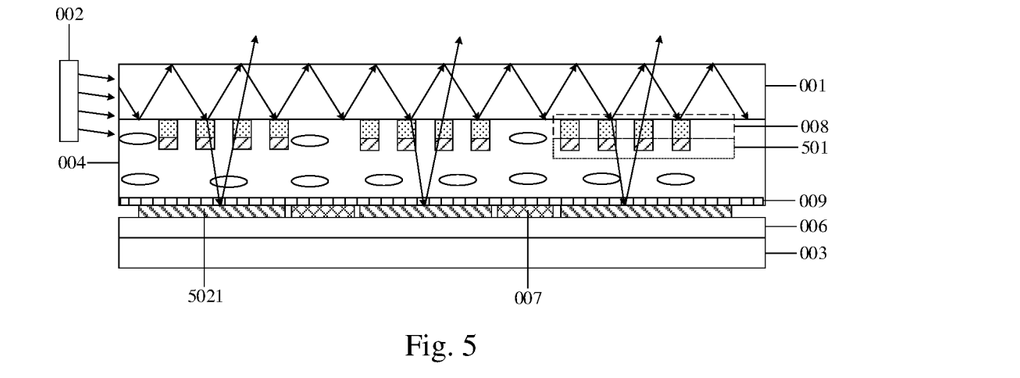
FIG. 5 is a schematic diagram of the display device which is illustrated in FIG. 1e and displays a L255 gray scale.

For example, for the display device as illustrated in FIG. 1e, the case where the refractive index of the transmissive grating structure 008 is equal to no is taken as an example. As illustrated in FIG. 4, the initial orientation of the liquid crystal molecules in the liquid crystal layer 004 is perpendicular to the waveguide plate 001 and the lower substrate 003, in the case where the refractive index of the liquid crystal layer 004 and the refractive index of the transmissive grating structure 008 are equal, that is, are both equal to no, the effect of the transmissive grating structure 008 is covered, the light propagates in the waveguide plate 001, and no light is coupled out from the waveguide plate 001, and the grayscale is minimum in this case, which is the L0 state; the orientation of the liquid crystal molecules in the liquid crystal layer 004 is rotated to the direction parallel to the waveguide plate 001 and the lower substrate 003 through adjusting the voltage applied to the liquid crystal layer 004 from the electrode structures 005, as illustrated in FIG. 5, in this case, the difference between the refractive index (ne) of the liquid crystal layer 004 and the refractive index (no) of the transmissive grating structures 008 is maximum, and the coupling effect of the transmissive grating structures 008 is most apparent, the coupling efficiency of the light from the waveguide plate 001 is the highest, in this case, the grayscale is maximum, which is the L255 state.

For example, in the touch display panel and the display device provided by at least one embodiment of the present disclosure, the fingerprint recognition is achieved through the energy difference between the light beams emitted from the ridge and the valley of the fingerprint and received by the photosensitive units 007.

Figure 6:
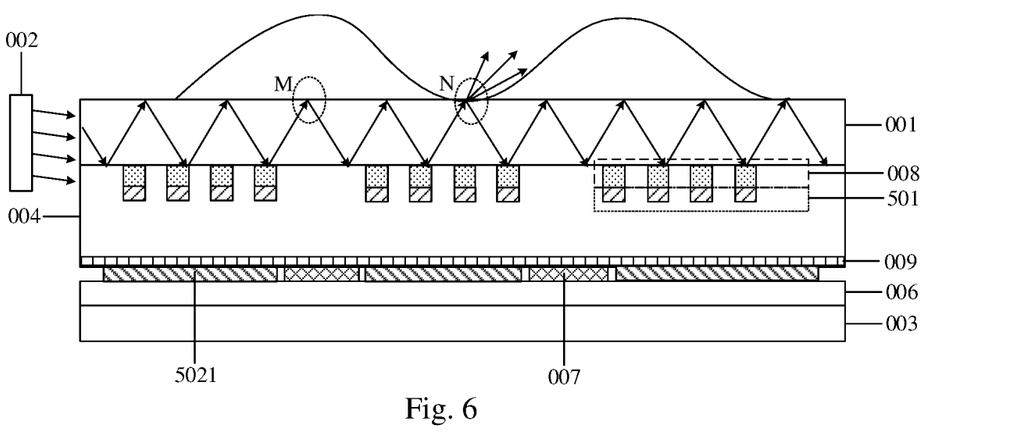
FIG. 6 is a schematic diagram illustrating a principle of fingerprint recognition of the display device as illustrated in FIG. 1e.

For example, in the normal display, the incident light emitted from the collimated light source 002 is totally reflected at the upper interface of the waveguide plate 001, the light is emitted out only from the lower surface at the side, which faces toward the lower substrate 003, of the waveguide plate 001 and incident onto the respective photosensitive units 007. In the case where the finger presses the waveguide plate 001, as illustrated in FIG. 6, the region where the valley M of the fingerprint of the finger is located is air, when the light is incident onto the region where the valley M is located, because an external medium is still air, which is the same as an external medium in the normal display, and therefore, the light in the region where the valley M is located is totally reflected, so that the energy of the light received by the photosensitive unit 007 remains unchanged; however, when the light is incident onto the region where the ridge N is located, because the region where the ridge N is located is the epidermal layer of the finger, that is, an external medium is the epidermal layer of the finger, part of the incident light is emitted out from the region where the ridge N is located, which causes the energy of the light which is received by the photosensitive unit 007 is reduced apparently, thus the fingerprint can be accurately recognized according to the large difference between the energies of the received light beams from the ridge N and the valley M of the fingerprint.

In the touch display panel and the display device provided by at least one embodiment of the present disclosure, as illustrated in FIG. 1b and FIG. 1f, the reflective layer 006 may, for example, include the plurality of reflective structures 601 which are spaced apart from each other, in this case, the photosensitive unit 007 may be disposed in a gap between two adjacent reflective structures 601. In other embodiments, the reflective layer 006 may also be, for example, a film layer disposed on the entire surface.

For example, in the touch display panel and the display device provided by at least one embodiment of the present disclosure, as illustrated in FIG. 1b and FIG. 1f, the reflective structures 601 may be reflective grating structures. Because the reflective grating structure can both reflect light and disperse the light, based on this, the reflective structures 601 can have functions of reflecting light and splitting light, in this case, disposing of the color film layer can be omitted, so that the touch display panel is relatively thin and the light transmittance is relatively high, thereby improving the accuracy of the fingerprint recognition.

In other the embodiments, the reflective structures 601 may also be other components with a reflective function only; in this case, in order to achieve color display, a color film layer is separately disposed in the touch display panel. A specific position of the color film layer can be designed according to actual needs, and no specific limitation will be given in the embodiments of the present disclosure.

For example, in the touch display panel and the display device provided by at least one embodiment of the present disclosure, as illustrated in FIG. 1b and FIG. 1f, the reflective grating structures (that is, the reflective structures 601) can be implemented through the following ways. For example, a reflective structure 601 includes a plurality of grating stripes 601A which are spaced apart from each other, and the grating gaps 601B, each of the grating gaps 601B is at corresponding two adjacent grating stripes 601A.

For example, in the touch display panel and the display device provided by at least one embodiment of the present disclosure, the electrode structure 005 is configured to control the liquid crystal molecules in the liquid crystal layer 004 to rotate, so as to achieve to control the display grayscales. Based on this, the electrode structure 005 may include: a plurality of first electrode structures 501 which are disposed at the side, which faces toward the liquid crystal layer 004, of the respective reflective structures 601 (for example, the reflective grating structures) and are in one-to-one correspondence with the respective reflective structures 601 (for example, the reflective grating structures), and a second electrode structure 502 at the side, which faces toward the liquid crystal layer 004, of the waveguide plate 001, as illustrated in FIG. 1b and FIG. 1f.

For example, in the case where the reflective structure 601 includes the plurality of grating stripes (that is, the reflective structure 601 is the reflective grating structure) which are spaced apart from each other, a first electrode structure 501 may include: a plurality of electrode stripes 501A on the respective grating stripes 601A in the corresponding reflective grating structure, and the width of the electrode stripe 501 in the direction in which the plurality of electrode stripes 501A are arranged is not greater than the width of the grating stripe 601A in the direction in which the plurality of electrode stripes 501A are arranged, for example, the width of the electrode stripe 501A may be equal to the width of the grating stripe 601A.

In the touch display panel and the display device provided by other embodiments of the present disclosure, the electrode structure 005 may also be achieved by other ways, and no limitation is given herein.

For example, the electrode structure 005 may also include: first electrode structures 501 which are at the side, which faces toward the waveguide plate 001, of the reflective grating structures and are in one-to-one correspondence with the reflective grating structures, and a second electrode structure 502 disposed between the lower substrate 003 and the layer where the reflective grating structures are located.

For another example, the electrode structure 005 may further include: first electrode structures 501 which are between the layer where the reflective grating structures are located and the lower substrate 003 and are in one-to-one correspondence with the reflective grating structures, and a second electrode structure 502 which is at the side, which faces toward each of the reflective grating structures, of the waveguide plate 001.

In addition, in the embodiments, as illustrated in FIG. 1b and FIG. 1f, of the present disclosure, an arrangement mode of the alignment layer 009 is the same as an arrangement mode of the alignment layer 009 illustrated in FIG. 1a and FIG. 1e of the present disclosure, and details are not described herein.

The principle that the touch display panel and the display device provided by the embodiment illustrated in FIG. 1b and FIG. 1f of the present disclosure achieves functions of normal display and the fingerprint recognition is described in detail in the following.

In a specific implementation, the vertical electrical field acting on the liquid crystal layer 004 is adjusted through adjusting the voltage applied by the electrode structure 005 as illustrated in FIG. 1b and FIG. 1f, thereby achieving the liquid crystal molecules in the liquid crystal layer 004 are rotated in the cross-sectional plane as illustrated in FIG. 1b and FIG. 1f, so as to implement the change of the refractive index of the liquid crystal molecules in the liquid crystal layer 004 between no and ne, and achieve different grayscales; in which no is the refractive index of the liquid crystal molecules in the liquid crystal layer 004 for the o-polarized light, ne is the refractive index of the liquid crystal molecules in the liquid crystal layer 004 for the e-polarized light.

For example, the emission efficiency of the light emitted out from the waveguide plate 001 decreases along with an increase of the difference between the refractive index of the liquid crystal molecules in the liquid crystal layer 004 and the refractive index of the waveguide plate 001. For example, for the display device as illustrated in FIG. 1f, by taking the case where the refractive index of the waveguide plate 001 is equal to ne as an example, in the case where the difference between the refractive index (no) of the liquid crystal layer 004 and the refractive index (ne) of the waveguide plate 001 is maximum, the light propagates in the waveguide plate 001, the no light is emitted out from the waveguide plate 001, which is the L0 state in this case; in the case where the refractive index of the liquid crystal layer 004 and the refractive index of the waveguide plate 001 are equal (that is, both are equal to ne), the emission efficiency of the light emitted from the waveguide plate 001 is the highest, which is the L255 in this case; in the case where the refractive index of the liquid crystal layer 004 is between the above-mentioned two cases, it is in a state with other grayscale.

For example, in the touch display panel and the display device provided by the embodiment illustrated in FIG. 1b and FIG. 1f of the present disclosure, recognition of the fingerprint is achieved through the difference between the energies of the light beams emitted from the ridge and the valley of the fingerprint and received by the photosensitive units 007.

Figure 7:
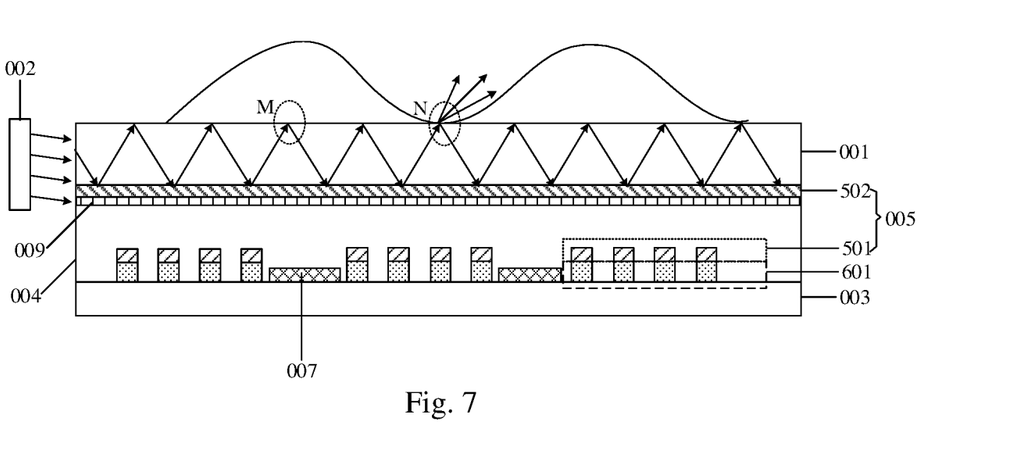
FIG. 7 is a schematic diagram illustrating a principle of fingerprint recognition of the display device as illustrated in FIG. 1f.

For example, in the normal display, the incident light emitted from the collimated light source 002 is totally reflected at the upper interface of the waveguide plate 001, the light is emitted out to the photosensitive units 007 only from the lower surface which is at the side, which faces toward the lower substrate 003, of the waveguide plate 001. When the finger presses the waveguide plate 001, as illustrated in FIG. 7, the region where the valley M of the fingerprint of the finger is located is air, in the case where the light is incident onto the region where the valley M is located, because an external medium is still air, which is the same as the external medium in the normal display, and therefore, the light in the region where the valley M is located is totally reflected, so that the energy of the light received by the photosensitive unit 007 remains unchanged; however, when the light is incident onto the region where the ridge N is located, because the region where the ridge N is located is the epidermal layer of the finger, that is, an external medium is the epidermal layer of the finger, part of the incident light is emitted out from the region where the ridge N is located, which causes the energy of the light which is received by the photosensitive unit 007 is reduced apparently, and therefore the photosensitive sensor unit 007 can accurately recognize the fingerprint according to the large difference in energies between the light beams which are emitted from the ridge N and the valley M of the fingerprint and received by the photosensitive unit 007.

Figure 8:
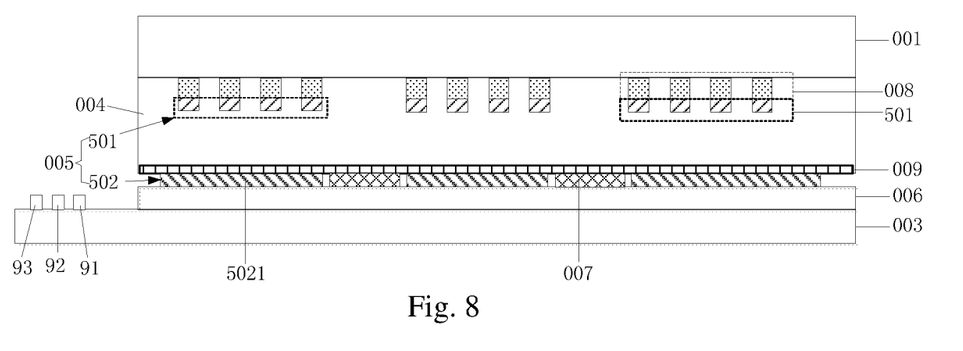
FIG. 8 is schematic structural diagram of a fingerprint recognition device provided by an embodiment of the present disclosure.

At least one embodiment of the present disclosure provides a fingerprint recognition device, as illustrated in FIG. 8, the fingerprint recognition device includes: a waveguide plate 001 and a lower substrate 003 which are opposite to each other, a liquid crystal layer 004 and an electrode structure 005 which are between the waveguide plate 001 and the lower substrate 003, a reflective layer 006 at a side, which faces toward the liquid crystal layer 004, of the lower substrate 003, a plurality of photosensitive units 007 (for example, the photosensitive sensors) at the side, which faces toward the liquid crystal layer 004, of the lower substrate 003 or at a side, which faces toward the liquid crystal layer 004, of the waveguide plate 001. In the fingerprint recognition device, the electrode structure 005 is configured to control a refractive index of liquid crystal molecules in the liquid crystal layer 004, so as to allow the light to be emitted out from a lower surface, which is closer to the liquid crystal layer 004, of the waveguide plate 001, or to allow the light to be totally reflected inside the waveguide plate 001.

For example, the fingerprint recognition device includes a plurality of grating structures which are spaced apart from each other (FIG. 8 takes a case where the grating structures are transmissive grating structures 008 as an example), the grating structures are in contact with the liquid crystal layer 004; the electrode structure 005 is configured to control a relationship between the refractive index of the liquid crystal molecules in the liquid crystal layer 004 and a refractive index of a grating structure, so as to allow the light to be emitted out from the lower surface of the waveguide plate 001 or to allow the light to be totally reflected at the lower surface of the waveguide plate 001.

For example, in order to reduce the influence of the display light on the accuracy rate of the fingerprint recognition, the fingerprint recognition device provided by the embodiments of the present disclosure includes a memory 91 and a calculator 92; the memory is configured to store first light intensities detected by a photosensitive unit 007 at each of positions in different grayscales when the fingerprint recognition device only performs fingerprint recognition; the calculator is configured to calculate the differences between the second light intensities, which are detected by the photosensitive unit at the each of the positions when the fingerprint recognition device simultaneously performs the fingerprint recognition and display, and the first light intensities, and to obtain a fingerprint according to the differences.

For example, in order to further improve the accuracy rate of the fingerprint recognition, the light in the fingerprint recognition region can have the same grayscale. For example, in this case, the fingerprint recognition device includes a controller 93, which is configured to control the fingerprint recognition region to display under a single grayscale signal during performing the fingerprint recognition (that is, sub-pixels in the fingerprint recognition region in the touch display panel are controlled to be inputted with the same gray scale signal).

For example, the above-mentioned memory may include at least one of a read-only memory and a random access memory, and provides instructions and data to a processor. A portion of the memory may also include, a non-volatile random access memory (NVRAM). For example, the above-mentioned calculator and controller may be processors, for example, the processors may be general purpose processors, digital signal processors (DSPs), application specific integrated circuits (ASIC), field programmable gate arrays (FPGAs), or other programmable logic devices, discrete gate circuits or transistor logic devices, and discrete hardware components.

The principle that the fingerprint recognition device achieves the fingerprint recognition and setting manners of respective components in the fingerprint recognition device may be referred to related descriptions in the embodiments of touch display panel, repeated portions will be omitted here.

The above-mentioned touch display panel, fingerprint recognition device and display device provided by the embodiments of the present disclosure include: a waveguide plate and a lower substrate which are opposite to each other, a liquid crystal layer and an electrode structure which are between the waveguide plate and the lower substrate, a reflective layer at a side, which faces toward the liquid crystal layer, of the lower substrate, and a plurality of photosensitive units at the side, which faces toward the liquid crystal layer, of the lower substrate, or at a side, which faces toward the liquid crystal layer, of the waveguide plate. The electrode structure is configured to control a refractive index of liquid crystal molecules in the liquid crystal layer, so as to allow light to be emitted out from a lower surface, which is closer to the liquid crystal layer, of the waveguide plate, or to allow the light to be totally reflected inside the waveguide plate. For example, in normal display, by controlling the refractive index of the liquid crystal molecules in the liquid crystal layer through the electrode structure, the light is allowed to be emitted out from the lower surface, which is closer to the liquid crystal layer, of the waveguide plate to the reflective layer and the photosensitive unit, and the light is emitted out from one side of the waveguide plate after being reflected by the reflective layer, so as to achieve display; when the waveguide plate is touched, part of the light is emitted out from the upper surface, which is away from the liquid crystal layer, of the waveguide plate where the touch position is located to outside of the touch display panel, the remaining other part of the light is emitted out to the photosensitive units from the lower surface, which is closer to the liquid crystal layer, of the waveguide plate, such that the photosensitive units can determine the touch position according to the energy difference between the light received under the touch condition and the light received under the normal display. In at least one embodiment, the material of the reflective layer is a metal with high reflectivity, and therefore, in the case where the photosensitive units are integrated onto the lower substrate or the waveguide plate, the aperture ratio of the touch display panel is not affected, such that the aperture ratio of the touch display panel is guaranteed while the touch function is achieved.

It should be noted that, in the present disclosure, the relationship terms such as "first," "second," are only used to distinguish one entity or operation from another entity or operation, but are not intended to require or indicate any actual relationship or sequence among these entities or operations.

What are described above are illustrative embodiments of the disclosure only and are not intended to limit the scope of the disclosure, and the scope of the disclosure is defined by the accompanying claims.

What is claimed is:

1. A touch display panel, comprising:
a waveguide plate and a first substrate opposite to each other,
a liquid crystal layer and an electrode structure between the waveguide plate and the first substrate,
a reflective layer at a first side of the first substrate facing toward the liquid crystal layer, and
a plurality of photosensitive units at the first side, or at a second side of the waveguide plate facing toward the liquid crystal layer;
wherein the electrode structure is configured to control a refractive index of liquid crystal molecules in the liquid crystal layer, so as to allow light to be emitted out from a first surface of the waveguide plate closer to the liquid crystal layer, or to allow the light to be totally reflected inside the waveguide plate;
the touch display panel comprises a plurality of grating structures spaced apart from each other, and the grating structures are in contact with the liquid crystal layer;
the electrode structure is configured to control a relationship between the refractive index of the liquid crystal molecules in the liquid crystal layer and a refractive index of a grating structure, so as to allow the light to be emitted out from the first surface of the waveguide plate, or to allow the light to be totally reflected at the first surface of the waveguide plate.

2. The touch display panel according to claim 1, wherein a refractive index of each of the grating structures is in a range of [no, ne], wherein no is a refractive index of the liquid crystal molecules in the liquid crystal layer for o-polarized light, ne is a refractive index of the liquid crystal molecules in the liquid crystal layer for e-polarized light.

3. The touch display panel according to claim 1, wherein the grating structures are reflective grating structures, each of the reflective grating structures comprises a plurality of grating stripes spaced apart from each other and grating gaps, each of the grating gaps is between two adjacent grating stripes.

4. The touch display panel according to claim 3, wherein the reflective layer comprises a plurality of reflective structures spaced apart from each other, and the reflective structures serve as the reflective grating structures.

5. The touch display panel according to claim 3, wherein the electrode structure comprises:
first electrode structures which are at a third side of the reflective grating structures facing toward the liquid crystal layer, and are in one-to-one correspondence with the reflective grating structures, and
a second electrode structure at the second side.

6. The touch display panel according to claim 3, wherein an emission efficiency of the light emitted out from the first surface of the waveguide plate decreases along with an increase of a difference between the refractive index of the liquid crystal molecules in the liquid crystal layer and a refractive index of the waveguide plate.

7. The touch display panel according to claim 1, wherein the plurality of grating structures are a plurality of transmissive grating structures at the second side.

8. The touch display panel according to claim 7, wherein
in a case where the refractive index of the liquid crystal molecules in the liquid crystal layer is equal to the refractive index of the grating structure, the light is totally reflected at the first surface of the waveguide plate; and
in a case where the refractive index of the liquid crystal molecules in the liquid crystal layer is not equal to the refractive index of the grating structure, the light is at least partially emitted out from the first surface of the waveguide plate.

9. The touch display panel according to claim 7, wherein the electrode structure comprises first electrode structures, and the first electrode structures are at a fourth side of the transmissive grating structures facing toward the liquid crystal layer and are in one-to-one correspondence with the transmissive grating structures.

10. The touch display panel according to claim 7, wherein the electrode structure further comprises a second electrode structure, the second electrode structure comprises second sub-electrode structures, the second sub-electrode structures are at the first side, and are in one-to-one correspondence with the transmissive grating structures.

11. The touch display panel according to claim 10, wherein the photosensitive units are each in a gap between two adjacent second sub-electrode structures.

12. The touch display panel according to claim 10, wherein the reflective layer is between the first substrate and a layer where the second sub-electrode structures are located.

13. The touch display panel according to claim 1, further comprising:
an alignment layer at the second side and/or an alignment layer at the first side.

14. The touch display panel according to claim 1, wherein the electrode structure comprises a plurality of first electrode structures spaced apart from each other, and comprises a second electrode structure, and
a layer where the first electrode structures are located and a layer where the second electrode structure is located are opposite to each other.

15. A display device, comprising:
the touch display panel according to claim 1, and
a collimated light source on at least one side edge of the waveguide plate, wherein collimated light emitted out by the collimated light source is incident onto the waveguide plate at an incident angle satisfying a total reflection condition of the waveguide plate.

16. The display device according to claim 15, wherein the incident angle is greater than or is equal to arcsin $(n_0/n_1)$; where $n_0$ is a refractive index of air, and $n_1$ is a refractive index of the waveguide plate.

17. A fingerprint recognition device, comprising:
a waveguide plate and a first substrate opposite to each other,
a liquid crystal layer and an electrode structure between the waveguide plate and the first substrate,
a reflective layer at a first side of the first substrate facing toward the liquid crystal layer, and
a plurality of photosensitive units at the first side, or at a second side of the waveguide plate facing toward the liquid crystal layer;
wherein the electrode structure is configured to control a refractive index of liquid crystal molecules in the liquid crystal layer, so as to allow light to be emitted out from a first surface of the waveguide plate closer to the liquid crystal layer, or to allow the light to be totally reflected inside the waveguide plate;

the fingerprint recognition device comprises a plurality of grating structures spaced apart from each other, and the grating structures are in contact with the liquid crystal layer; and the electrode structure is configured to control a relationship between the refractive index of the liquid crystal molecules in the liquid crystal layer and a refractive index of a grating structure, so as to allow the light to be emitted out from the first surface of the waveguide plate, or to allow the light to be totally reflected at the first surface of the waveguide plate.

18. The fingerprint recognition device according to claim 17, further comprising:

a memory, which is configured to store first light intensities detected by a photosensitive unit at each of positions in different grayscales when the fingerprint recognition device only performs fingerprint recognition;

a calculator, which is configured to calculate differences between second light intensities, which are detected by the photosensitive unit at the each of the positions when the fingerprint recognition device simultaneously performs the fingerprint recognition and display, and the first light intensities, and to obtain a fingerprint according to the differences; and a controller, which is configured to control a fingerprint recognition region to display under a single grayscale signal when performing the fingerprint recognition.

* * * * *